United States Patent
Dockstader et al.

(10) Patent No.: US 9,238,386 B2
(45) Date of Patent: Jan. 19, 2016

(54) MACHINE AXLE HOUSING WITH INTEGRATED OIL CIRCULATION SYSTEM

(71) Applicant: CATERPILLAR INC., Peoria, IL (US)

(72) Inventors: Stephen Dockstader, Peoria, IL (US); Joshua Jensen, Peoria, IL (US); Jason Weber, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 13/843,584

(22) Filed: Mar. 15, 2013

(65) Prior Publication Data

US 2014/0265541 A1    Sep. 18, 2014

(51) Int. Cl.

| | |
|---|---|
| *F01M 11/00* | (2006.01) |
| *B60B 35/16* | (2006.01) |
| *F16D 65/00* | (2006.01) |
| *B60B 35/12* | (2006.01) |
| *F16D 65/853* | (2006.01) |
| *F16H 57/04* | (2010.01) |
| *F16D 69/00* | (2006.01) |

(52) U.S. Cl.
CPC ............ *B60B 35/124* (2013.01); *B60B 35/163* (2013.01); *F16D 65/853* (2013.01); *F16H 57/0423* (2013.01); *F16H 57/0427* (2013.01); *F16H 57/0445* (2013.01); *F16H 57/0457* (2013.01); *F16H 57/0473* (2013.01); *F16H 57/0483* (2013.01); *F16D 2069/004* (2013.01); *Y10T 29/49464* (2015.01)

(58) Field of Classification Search
CPC ............ F16H 57/0473; F16H 57/0483; F16D 65/853; F16D 2069/004
See application file for complete search history.

(56) References Cited

U.S. PATENT DOCUMENTS

| | | | |
|---|---|---|---|
| 4,113,067 A | | 9/1978 | Coons et al. |
| 4,468,981 A | * | 9/1984 | Ries ..................... B60K 17/16 180/370 |
| 4,629,050 A | * | 12/1986 | Valier ..................... 192/113.34 |
| 4,655,326 A | * | 4/1987 | Osenbaugh ................ 188/18 A |
| 4,961,485 A | * | 10/1990 | Huff et al. .................. 192/221.1 |
| 5,197,574 A | | 3/1993 | Al-Deen et al. |
| 5,197,929 A | * | 3/1993 | Scheiber et al. .............. 475/160 |
| 5,316,106 A | * | 5/1994 | Baedke et al. ............... 184/6.12 |
| 5,535,850 A | * | 7/1996 | Tar et al. ..................... 184/6.12 |
| 5,967,929 A | * | 10/1999 | Matsuoka et al. ............. 475/159 |
| 6,345,712 B1 | | 2/2002 | Dewald et al. |
| 6,866,605 B2 | * | 3/2005 | Fabry ............................ 475/20 |
| 7,281,619 B2 | | 10/2007 | Kuhn |
| 8,267,827 B2 | * | 9/2012 | Durbin et al. ................. 475/159 |
| 8,475,319 B2 | * | 7/2013 | Forssberg ............... F16D 13/74 475/230 |

(Continued)

*Primary Examiner* — William E Dondero
*Assistant Examiner* — Minh Truong
(74) *Attorney, Agent, or Firm* — Miller, Matthias & Hull LLP (57) ABSTRACT

A machine axle housing includes a central body having an oil reservoir and a pair of axle legs. The central body includes a ring gear, an oil channel, and oil port for conveying oil through an oil conduit to each leg. Machine brakes within the central body include at least one disc rotatably adapted to centrifugally move oil radially outwardly of the brakes. A second oil channel collects oil from the disc, and a passageway extends from the second oil channel back to the central body to return oil from the legs back to the central body. The ring gear, first oil channel and first oil conduit define a first oil lubrication sub-system for moving oil from the central body to right and left legs, and the disc, second oil channel, and passageway define a second oil lubrication sub-system for moving oil from the legs back to the central body.

17 Claims, 7 Drawing Sheets

(56) References Cited

U.S. PATENT DOCUMENTS

2011/0281680 A1* 11/2011 Forssberg .................... 475/160
2012/0031727 A1* 2/2012 Nett et al. .................. 192/113.1
2013/0313053 A1* 11/2013 Andersson ............ E02F 9/2083
                                                    188/71.5

* cited by examiner

MACHINE AXLE HOUSING WITH INTEGRATED OIL CIRCULATION SYSTEM

TECHNICAL FIELD

The present disclosure relates generally to lubrication of axle housings of machines and, more particularly, to axle oil circulation systems adapted to assure efficiency improvements in lubrication of components within the axle housing legs of large off-highway machines.

BACKGROUND

Axle housings of machines used in earth moving, construction, material handling, mining, and the like, are partially filled with oil for lubricating meshing gears and bearings contained in the housings. It is desirable to have a film of oil between meshing gear teeth in order to avoid degradation due to friction and resultant heat that can occur in contact areas of the teeth. Among other things, excessive heat may induce micro-welding between surfaces of the gear teeth which can lead to premature structural failure of the teeth.

Each axle housing typically contains a beveled toothed gear set such as a ring gear and a pinion gear. Those skilled in the art will appreciate that the teeth of the pinion gear mesh with the teeth of the ring gear, and that an output shaft of the transmission of a machine typically powers rotation of the pinion gear. The rotating pinion gear drives the ring gear and transfers power, through the rotating ring gear and differential case, to the wheels of the machine. The gear ratio of the pinion gear to the ring gear typically creates a reduction of the input speed from the transmission and an increase in torque applied to the wheels of the machine.

Generally, the axle housing is filled with enough oil to ensure that gear teeth, including those of the ring and pinion gears, are lubricated. Thus, a larger gear disposed generally vertically within the axle housing (such as the ring gear), which may require a lower fill level of oil in the axle housing, has to rotate through a much deeper oil fill level in order to ensure that other gears (for example, those with smaller diameters and/or those positioned horizontally) as well as the bearings are adequately lubricated by so-called "splash and spray oil". As such, the oil flow around a large gear, such as the ring gear, is often rendered undesirably turbulent due to depth of oil in which the gear must rotate. The input power required to overcome resistance of the oil to movement of the gear(s) may be referred to as "churning loss" or "parasitic loss." A churning loss is associated with increased fuel usage as more input power must be applied to compensate for the churning loss.

In addition, the axle housing must be filled with enough oil to lubricate componentry disposed in either end of the axle housing, and particularly within the legs of the axle housing. When, for example, the machine is operating on an incline, the oil in the axle housing tends to flow downhill toward the axle housing leg that is lowest on the incline. This flow pattern may in some instances increase the churning of the oil, or may decrease availability of oil for lubrication of componentry disposed in an opposite leg housing positioned higher on the incline. Neither has a beneficial outcome.

U.S. Pat. No. 6,345,712 to Dewald, et al., issued Feb. 12, 2002 is an example of prior art related to oil associated with differential axle drives. Dewald et al. discloses a lubrication arrangement in which brake lubricating oil is split into bifurcated cooling channels which flow in two different directions, one outwardly toward the wheels, and the other inwardly toward the differential case. Disadvantageously, the approach of Dewald et al. does not lend itself to an integrated oil circulation system within an axle housing. A better design might more effectively return the oil to the central body of an axle housing, to better establish predetermined desirable flows of oil throughout the entire axle housing. Thus, among other things, a unidirectional return oil passageway might improve oil flow from the inclined end of the axle housing when the axle housing is tilted, such as when on a hill by way of example. Because of the nature of hydrostatic forces, an enhanced return flow from the inclined end can actually facilitate an enhanced supply of oil to the inclined end.

SUMMARY OF THE DISCLOSURE

In accordance with a first aspect of the disclosure, an integrated axle oil lubrication system is adapted for an axle housing having a central body including an oil reservoir. The system includes a ring gear within the central body, the ring gear rotatable about an axis, and adapted to interface with the oil reservoir to distribute oil about the interior of the central body.

In accordance with another aspect, the system includes a pair of axle housing legs extending axially and oppositely of one another from the central body, the central body defining an interior wall having a first oil channel and an oil port in communication with the first oil channel. The first oil channel and oil port are adapted to convey oil externally of the central body, and an oil conduit may be secured to the oil port of the central body for conveyance of oil to each leg.

In accordance with yet another aspect, the system includes a pair of brakes situated at axially outboard portions of the central body, one brake situated on each side of the ring gear, each brake including at least one disc rotatably adapted to centrifugally move oil radially outwardly of the brakes.

In accordance with yet another aspect, a second oil channel is situated circumferentially outwardly of the brakes to collect oil from the disc, and extends from each respective brake through a second port and second conduit back to the central body for transfer of oil from the legs back to the central body.

In accordance with still a further aspect, the ring gear, the first oil channel, the first oil port, and the first oil conduit define a first oil lubrication sub-system adapted to move oil from the central body to the right and left legs.

Finally, in accordance with a still further aspect, the at least one disc, and the second oil channel, second port, and second conduit define a second oil lubrication sub-system adapted to move oil from the legs and brakes back to the central body.

DETAILED DESCRIPTION

Figure 1:
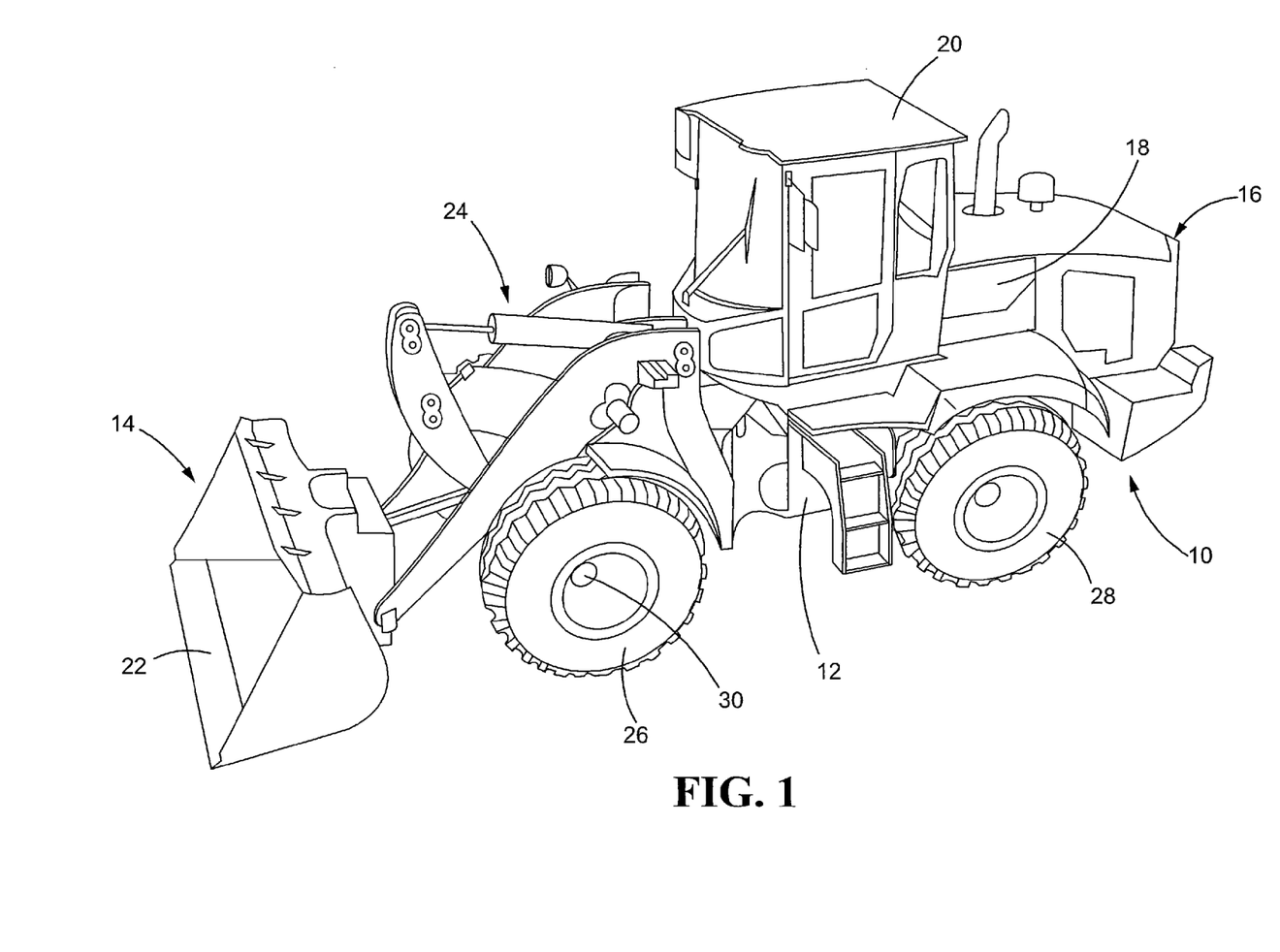
FIG. 1 is a perspective view of a machine that may incorporate the features of the present disclosure.

Referring now to the drawings, and initially with specific reference to FIG. 1, a machine 10 includes a frame 12, and has a front end 14 and a rear end 16, as shown. The machine 10 includes an engine compartment 18 adapted to contain an engine (not shown), and also includes an operator cab 20. At the front end 14 of the machine 10, at least one implement 22, such as the mechanical shovel or bucket shown, may be manipulated by an operator seated in the cab 20, as those skilled in the art may appreciate.

The implement 22 may be physically controlled by a system of hydraulic cylinders and control arms, indicated generally at 24, and the machine 10 may be supported and rendered transportable via sets of front wheels 26 and rear wheels 28. The front and rear wheels 26, 28 may be, in turn, supported respectively on a front axle 30 and a rear axle 32 (FIG. 1 depicts axle hubs, only).

Figure 2:
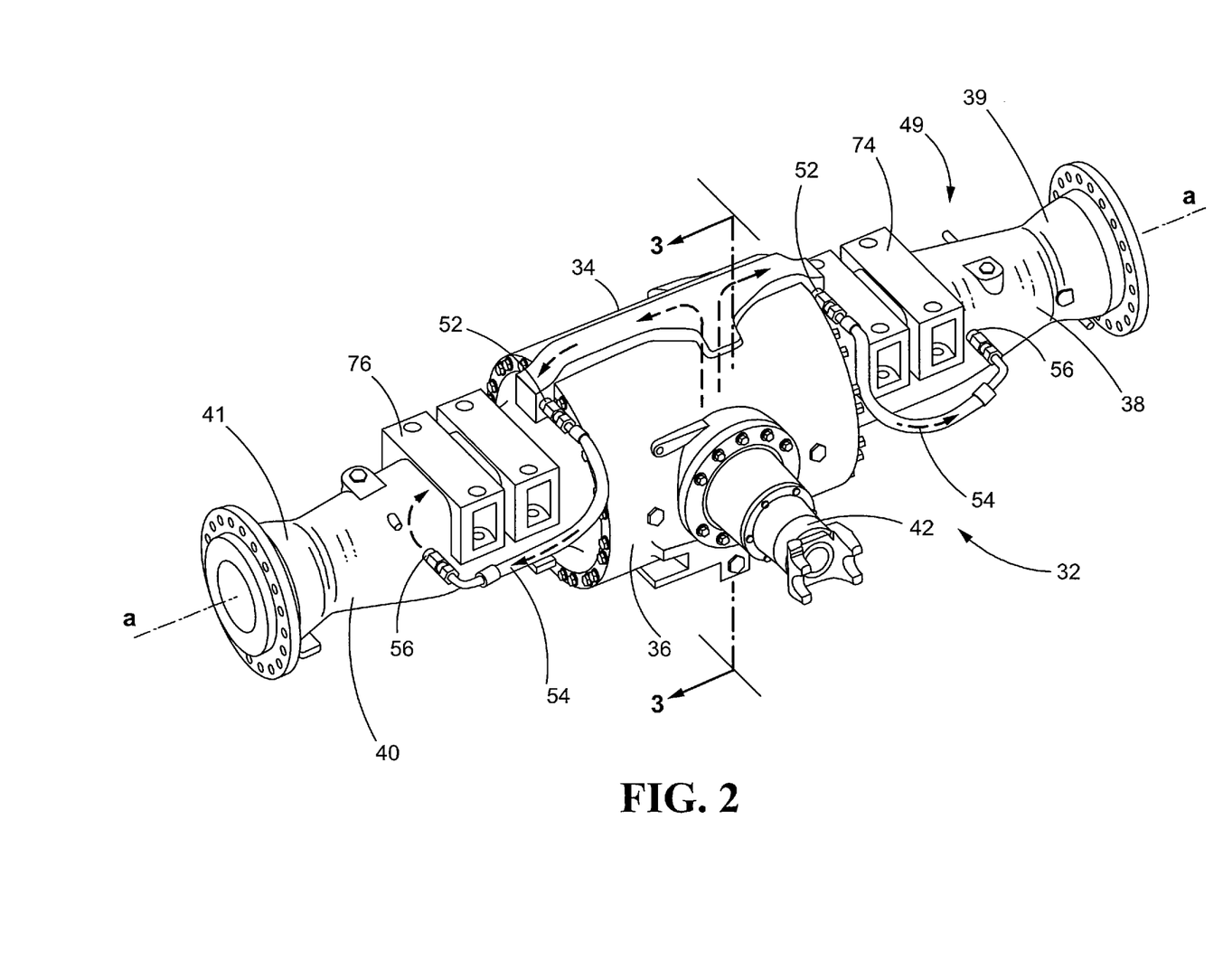
FIG. 2 is a perspective view of an exemplary axle housing assembly that may include the integrated oil circulation system of this disclosure.

Referring now also to FIG. 2, the rear axle 32 is depicted as a driving axle of the machine 10, and includes an elongated housing 34, formed of a central body 36, a left leg 38, and a right leg 40, all extending along a common axis a-a, the axis about which the rear wheels 28 (FIG. 1) rotate. The legs 38, 40 are reversely identical, and are labeled left and right respectively in accordance with the vantage point of an operator sitting facing forward in the cab 20. Each end of the left and right legs 38, 40 contains an axle wheel stub 39, 41, respectively, as well as pairs of mounting bosses 74, 76, adapted for securement of the axle 32 to the frame 12 of the machine 10.

Figure 3:
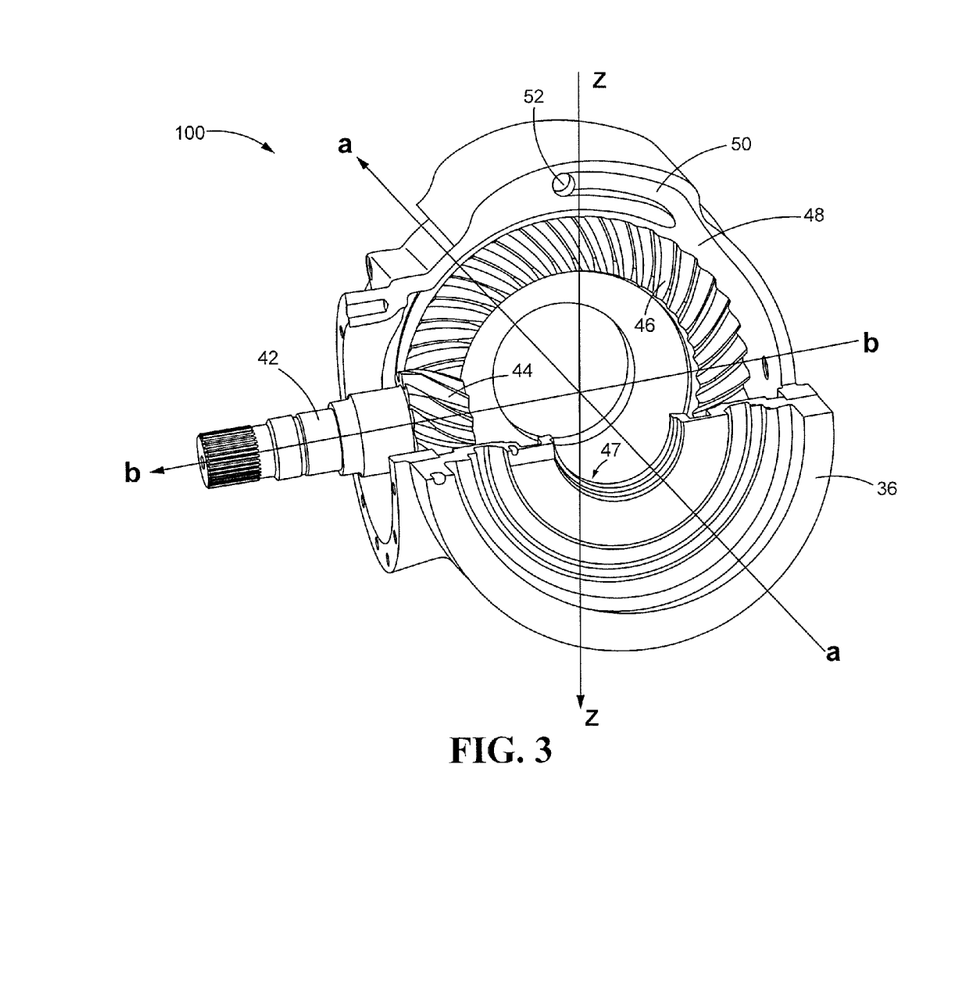
FIG. 3 is a cross-sectional and partial cutaway view of one embodiment of a central body of the axle housing assembly as shown along lines 3-3 of FIG. 2.

Referring now also to FIG. 3, a pinion shaft 42 may be integrally secured to a pinion gear 44, for example by forging. The pinion gear 44 is adapted to drivingly engage a ring gear 46, rotatably situated within the axle housing 34. As depicted, it will be appreciated that the pinion gear 44 and the ring gear 46 are both beveled, as is customary in the axle art. An oil reservoir in the nature of a gravity oil sump cavity is indicated at 47. The ring gear 46 is adapted to interface with the oil reservoir 47, and the movement of the ring gear 46 through the oil distributes "splash and spray" oil about the interior of the central body 36, including the walls 48. This action is normally sufficient to lubricate the typical components within the central body 34, including the differential case and certain other axle parts (not shown) that may be commonly supported and operable within the central body 34 of the rear driving axle 32.

Referring now specifically to FIG. 3, the ring gear 46 rotates about the axis a-a, while the pinion gear 44 rotates about an axis b-b, which orthogonally intersects the axis a-a. As depicted, the vertical axis z-z orthogonally intersects both axes a-a and b-b. To the extent that any gravitational force on the oil will be along the vertical axis z-z, it will be appreciated that an integrated oil circulation system 49 (FIG. 2) may be effective to enhance supply and return movements of oil out to the left and right legs 38, 40, as disclosed and described herein.

Referring now specifically to both FIGS. 2 and 3, as the ring gear 46 rotates about the axis a-a, some of the oil distributed about the interior walls 48 of the central body 36 may be conveyed via channel 50 through a port 52 for its continued travel via an oil conduit 54. The oil conduit 54 may be an external tube, as shown, or alternatively may be formed internally of the housing 34. The oil conduit may be formed of any temperature durable material, including flexible metal pipe. The oil conduit 54 may terminate at an oil port 56, formed at an extremity of each leg 38, 40, in a manner such that oil may be effectively supplied to the extremities of respective legs 38, 40 for lubricating the axle shaft 64 (FIG. 5) along with other components, such as planetary gear sets (not shown), within the interior cavities 55 (FIG. 5) of the legs 38, 40.

Figure 4:
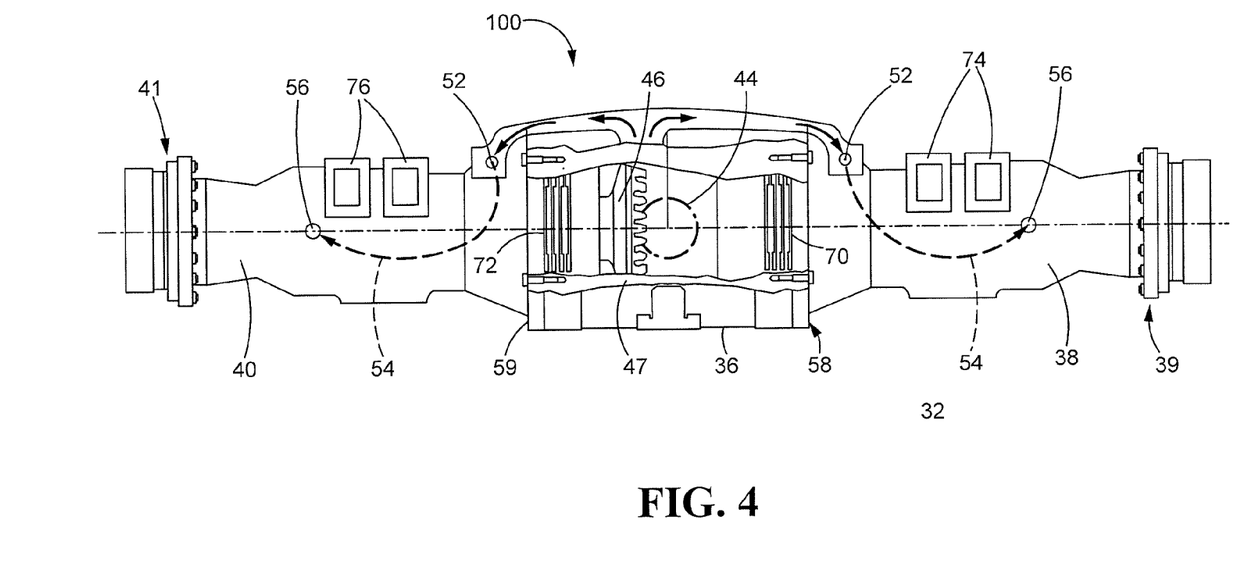
FIG. 4 is a partially cut-away elevational view of the exemplary axle housing assembly of FIG. 2.

Referring now to FIG. 4, the central body 36 may incorporate left and right service brakes 70 and 72 formed as interleaved disc brakes, and constructed in accordance with conventional service brake packs. In the arrangement shown, the pair of left and right service brakes 70, 72 are situated one on either side of the ring gear 46, and may otherwise be described as being positioned adjacent the left and right outboard ends 58, 59 of the central body 36.

Figure 5:
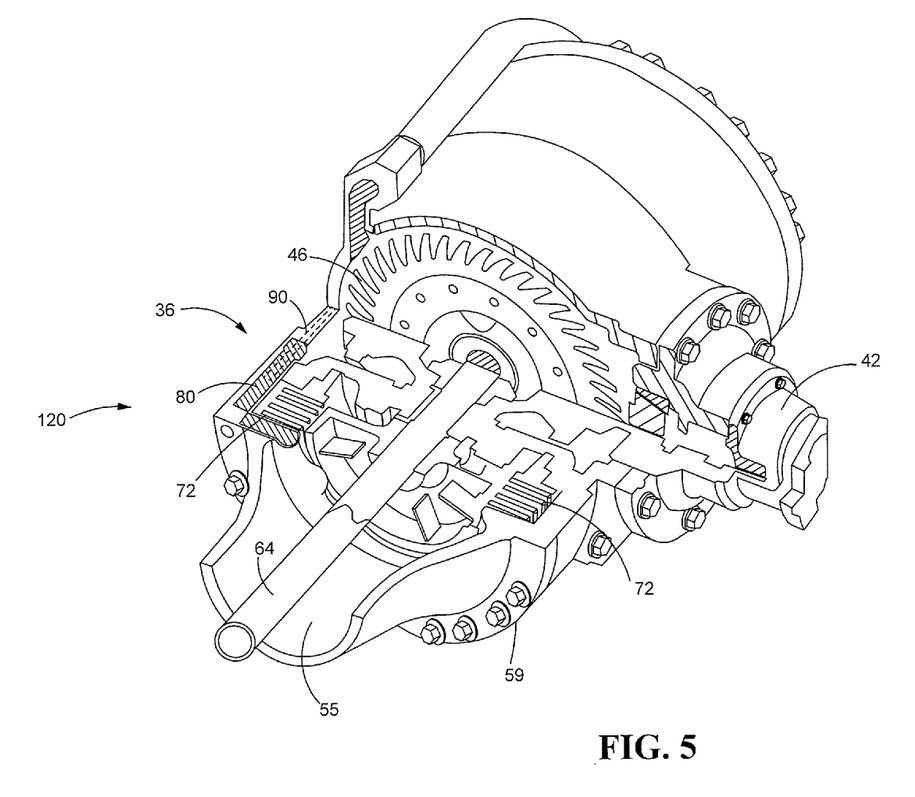
FIG. 5 is a perspective view of the central body of FIG. 3, partially cut-away to reveal greater detail.
Figure 6:
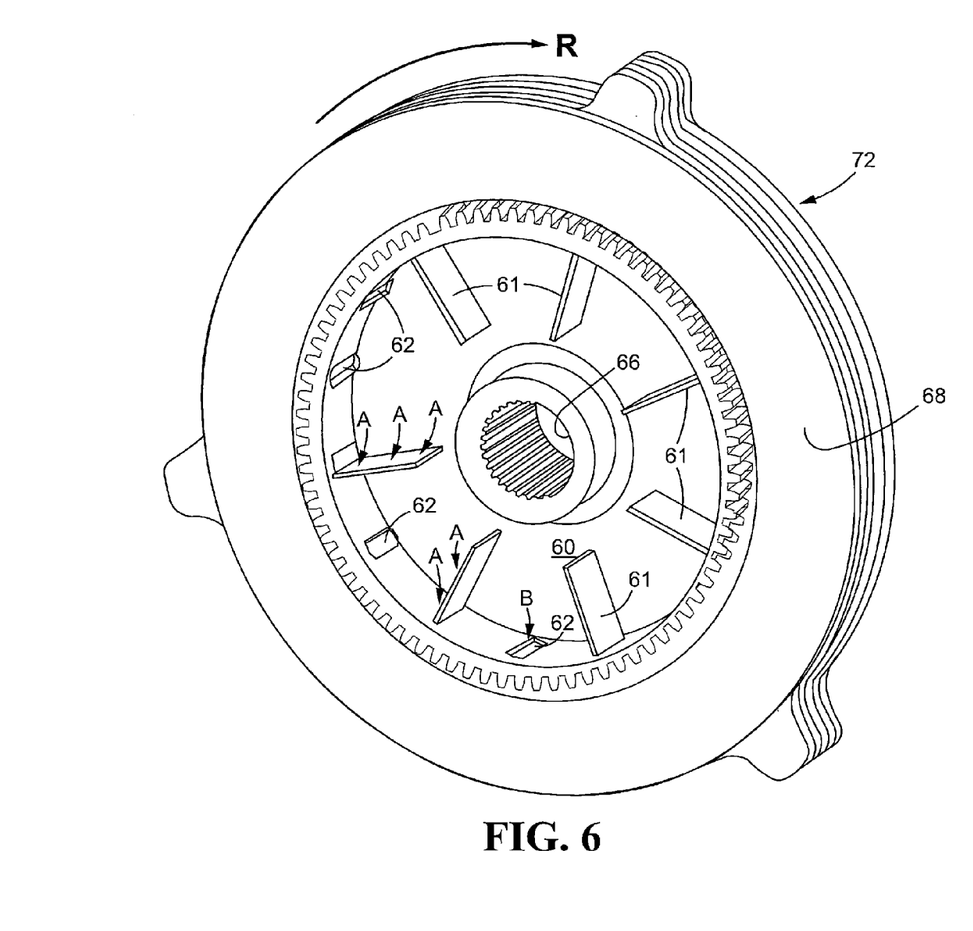
FIG. 6 is a perspective end view of a brake assembly of FIGS. 4 and 5.
Figure 7:
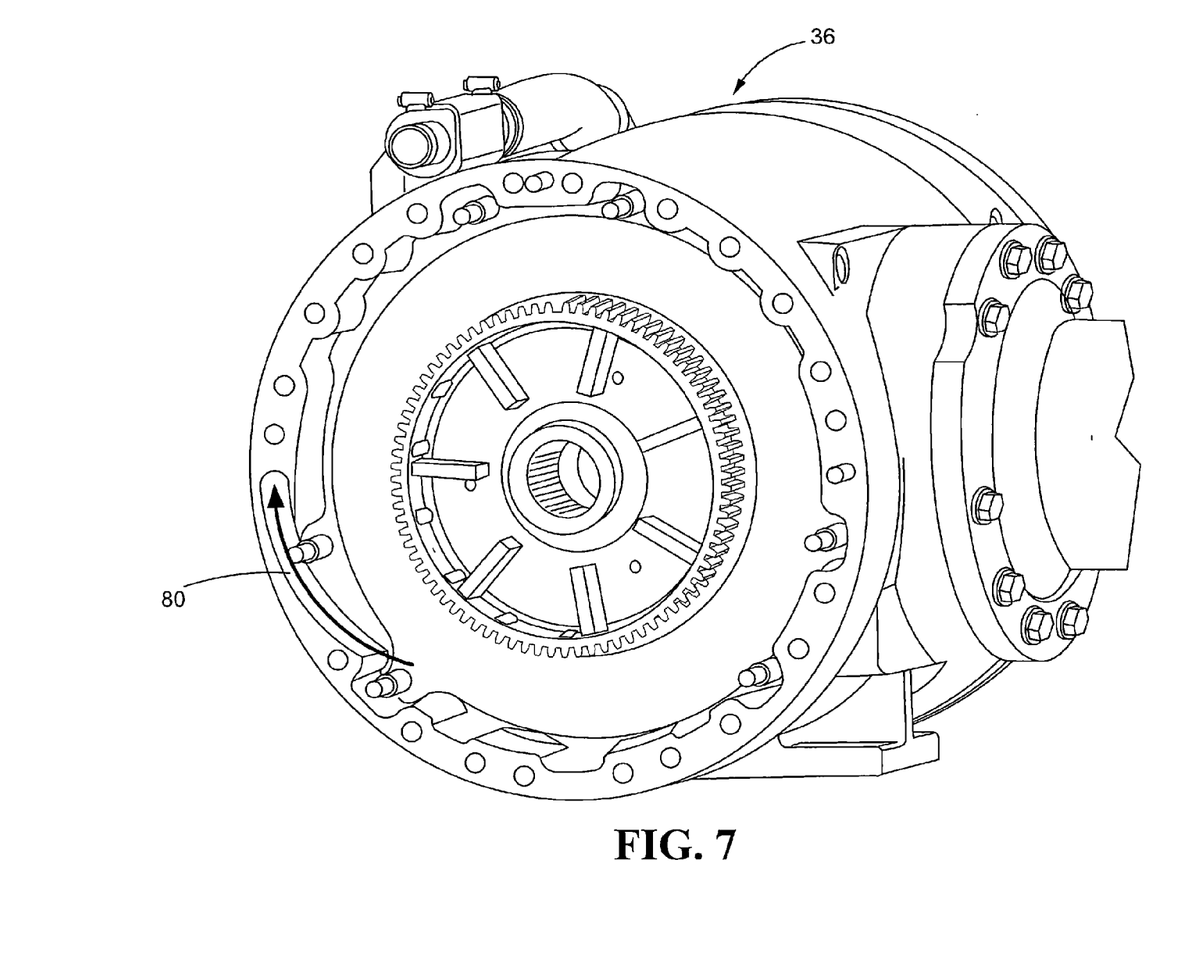
FIG. 7 is another perspective view of the central body, similar to that of FIG. 5, but with another partial cut-away to reveal a different detail.

Referring now to FIGS. 5, 6, and 7, only the right brake 72 is depicted. It will be appreciated that both the left and right service brakes 70, 72 (FIG. 4) are disclosed herein as disc brake assemblies designed and adapted to facilitate return oil travel from the legs 38, 40; i.e., to assure continuous movement of oil via the integrated oil circulation system 49 (FIG. 2). For this purpose, referring now specifically to FIG. 6, each brake assembly (only 72 shown) incorporates a central brake hub 60 having circumferentially spaced and radially extending bladed impellers 61. The hub 60 also incorporates a series of circumferentially spaced slots 62 positioned radially outwardly of the impellers 61 to receive return oil from along a respective axle shaft 64 (FIG. 5) of the legs 38, 40, and to radially outwardly move the oil from the interior 66 of the hub 60. Thus, as the hub 60 rotates (see arrow R), the oil is distributed radially outwardly, as shown by arrows A, and moved along the radially oriented impellers 61 under centrifugal forces imparted by rotation of the disc brake assembly. The oil then exits the hub 60 along paths reflected by the arrows B, and through the slots 62 to pass through the discs 68, as shown.

Referring now particularly to FIGS. 5 and 7, the oil that moves radially outwardly from the brake discs 68 collects within a second oil channel 80, circumferentially situated radially outwardly of the brakes 70, 72. The second oil channel may be formed as an integral part of the interior walls 48 of the central body 36. From the channel 80, an oil passageway 90 provides a unidirectional return travel of the oil from the channel 80 back to the oil reservoir 47 (FIG. 4) for the continuation of its circulation cycle of supply back to the legs 38, 40, etc.

INDUSTRIAL APPLICABILITY

The oil reservoir 47 of the disclosed machine axle housing 34 may contain a predetermined level of oil along axis z-z sufficient to provide lubrication for various moving parts within the entire axle housing 34, including the pinion and ring gears 44, 46, the bearings (not shown), the legs 38, 40, and the machine service brakes 70, 72. Based upon its enhanced oil movement efficiencies, the integrated oil circulation system 49 of the present disclosure may find applicability in reducing actual oil levels, including lessening of actual amounts of oil in the proximity of the rotating ring and pinion gears. The integrated oil circulation system 49 may also more effectively cool the oil within the axle housing, while offering enhanced sources of oil to cool the brakes 70, 72, as well as lubricate components disposed in the outlying cavities of the legs 38, 40, even when the machine is operating on inclined ground surfaces.

To the extent that churning losses associated with ring gear movement may be reduced, overall circulation efficiency may be commensurately improved, and more effective cooling may be realized. Indeed, the "pumping" actions associated with the ring gear and the brakes of the disclosed integrated oil circulation system 49 may be configured to positively circulate oil in predetermined paths within the axle, and to thus convert into useful work some of the energy otherwise lost as churning-generated heat.

In operation, the integrated oil circulation system 49 may be described as two subsystems for moving oil throughout the axle housing 34. The first subsystem may be defined as an oil lubrication supply subsystem 100, and includes the ring gear 46, the first oil channel 50, and the oil conduit 54. The subsystem 100 is adapted to supply oil from the central body 36 to the right and left legs 38, 40, as described above. The second subsystem may be defined as an oil lubrication return subsystem 120, and includes the brake discs 60, the second oil channel 80, and the passageway 90. The subsystem 120 is adapted to return oil from the legs 38, 40 back to the central body 36.

A method of making the disclosed integrated oil circulation system may be described as:

forming an axle housing including a central body having an oil reservoir;

providing a ring gear within the central body, such that the ring gear is rotatable about an axis, and adapted to interface with the oil reservoir for distributing oil radially within the central body;

providing and adapting a pair of axle housing legs to extend axially and oppositely of one another from the central body;

forming a first oil channel and an oil port in an interior wall of the central body, the oil port having communication with the first oil channel, the first oil channel and oil port being adapted to convey oil externally of the central body;

providing an oil conduit and securing the oil conduit to the oil port of the central body for conveying oil to each leg;

providing a pair of brakes including at least one disc rotatably adapted to centrifugally move oil radially outwardly of the brakes, and positioning the brakes at axially outboard portions of the central body with one brake situated on each side of the ring gear;

providing a second oil channel within the central body, the second oil channel being positioned radially outwardly of the brakes, and extending axially from each respective brake back to the central body to accommodate transfer of oil from the legs back to the central body;

such that the ring gear, the first oil channel, the first oil port, and the first oil conduit define a first oil lubrication sub-system adapted to move oil from the central body to the right and left housing legs; and such that the at least one disc, and the second oil channel define a second oil lubrication sub-system adapted to move oil from the legs and brakes back to the central body.

The described method may further include provision of a return oil passageway within the central body such that the second oil channel interfaces with the return oil passageway, and such that the return oil passageway defines a unidirectional flow of oil from the brakes to cause all oil to move only axially inwardly toward the central housing and away from the legs.

The integrated oil circulation system 49 as disclosed herein may be particularly beneficial to wheel loaders and other earth moving, construction, mining or material handling machines that utilize gear sets within oil filled axle housings.

What is claimed is:

1. A supply and return axle leg oil circulation system for an axle housing assembly, comprising:

an axle housing including a central body defining a first axis, a pair of legs extending from the central body, each leg extending along the first axis, each leg extending oppositely of the other from the central body;

a ring gear situated within the central body, the central body including a central cavity including an axle oil reservoir, a portion of the ring gear adapted to interface with the axle oil reservoir, the ring gear rotatable about the axis;

a right leg defining a right leg cavity and a left leg defining a left leg cavity, the central cavity disposed between the right and left leg cavities;

a first oil conduit extending from the central body to one leg and a second oil conduit extending from the central body to the second leg, the first and second conduits adapted to transport oil out of the central body and into each leg;

a right axle extending axially from the central body, a left axle extending axially from the central body, the right and left axles enclosed in the right and left leg cavities respectively, the first and second oil conduits supplying oil for lubricating the right and left axles;

a pair of brake assemblies situated along the axis at axially outboard portions of the central body, each brake assembly situated within the central body, wherein each brake assembly is positioned on an opposite side of the ring gear, each brake assembly including a central brake hub and at least one disc, each brake assembly rotatably adapted to receive return oil from along the respective axle shaft of each leg and centrifugally move oil radially outwardly therefrom;

a third and fourth oil conduit situated radially outwardly of each brake assembly, each of the third and fourth oil conduits extending radially and axially from each respective brake assembly toward the central body, the third and fourth oil conduits being adapted to accommodate transfer of oil from the legs back to the central body;

wherein the ring gear, a pinion gear, and first and second oil conduits comprise an outbound first axle leg oil porting system adapted for supply of oil to the legs from the central body; and wherein the at least one disc of each brake assembly, along with the third and fourth oil conduits, comprise an inbound second oil porting system adapted for return of oil from the legs to the central body.

2. The supply and return axle leg oil circulation system of claim 1, wherein the third and fourth conduits each comprise a second oil channel and a return oil passageway within the central body, wherein the second oil channel interfaces with the return oil passageway, and wherein the return oil passageway defines a unidirectional flow of oil from the brakes toward the central body and away from the legs.

3. The supply and return axle leg oil circulation system of claim 1, wherein the pinion gear is disposed along an axis, the pinion gear positioned orthogonally to the ring gear axis, wherein the pinion gear is meshed with the ring gear, and wherein the pinion gear is adapted to drive the ring gear.

4. The supply and return axle leg oil circulation system of claim 1, wherein the third conduit and the fourth conduit are axially spaced apart at respective outboard ends of the central body.

5. The supply and return axle leg oil circulation system of claim 1, wherein a first channel, an oil port, and the first and second oil conduits define an oil lubrication supply sub-system adapted to supply oil from the central body to the legs.

6. The supply and return axle leg oil circulation system of claim 1, wherein the brake assembly including a central brake hub and at least one disc, the central hub having a plurality of impellers.

7. The supply and return axle leg oil circulation system of claim 6, wherein the brake assembly having a plurality of circumferentially spaced slots, the slots being positioned radially outwardly of the impellers.

8. The supply and return axle leg oil circulation system of claim 7, wherein the slots extend radially outwardly from the central brake hub to facilitate transfer of oil to the third and fourth conduits.

9. An integrated axle oil lubrication system, comprising:
- an axle housing having an axis and including a central body having an oil reservoir;
- a ring gear disposed within the central body, the ring gear rotatable about the axis, and adapted to interface with the oil reservoir for distributing oil radially within the central body;
- a pair of axle housing legs extending axially and oppositely of one another from the central body, the central body defining an interior wall having a first oil channel and a first oil port in communication with the first oil channel, the first oil channel and the first oil port adapted to convey oil externally of the central body;
- an oil conduit secured to the first oil port of the central body for conveying oil out of the central body to each leg, the oil conduit secured to a second oil port formed at an extremity of each leg, the oil conduit and second oil port adapted for conveying oil to the extremity of each leg;
- a pair of axle shafts extending axially and oppositely of one another, the pair of axle shafts enclosed in the pair of axle housing legs, the oil conduit and second oil port supplying oil for lubricating the pair of axle shafts;
- a pair of brake assemblies positioned at axially outboard portions of the central body, each brake assembly situated within the central body, one brake assembly situated on each side of the ring gear, and each brake assembly including a central brake hub and at least one disc, the pair of brake assemblies rotatably adapted to receive return oil from along the respective axle shaft of each leg and centrifugally move oil radially outwardly of the brake assembly to a second oil channel;
- the second oil channel situated radially outwardly of the brake assemblies, and in communication with a return oil passageway extending axially from each respective brake back to the central body, the return oil passageway accommodates transfer of oil from the second oil channel back to the central body;
- wherein, the ring gear, the first oil channel, the first oil port, and the first oil conduit define a first oil lubrication sub-system adapted to move oil from the central body to the right and left housing legs; and
- wherein, the brake assemblies, the at least one disc, the second oil channel and the return oil passageway define a second oil lubrication sub-system adapted to move oil from the legs back to the central body.

10. The integrated axle oil lubrication system of claim 9, further comprising the return oil passageway extending axially from the brake assembly to the central body, wherein the second oil channel interfaces with the return oil passageway, and wherein the return oil passageway defines a unidirectional flow of oil from the brake assembly toward the central body and away from the legs.

11. The integrated axle oil lubrication system of claim 9, wherein a pinion gear is disposed along an axis, the pinion gear positioned orthogonally to the ring gear axis, wherein the pinion gear is meshed with the ring gear, and wherein the pinion gear is adapted to drive the ring gear.

12. The integrated axle oil lubrication system of claim 9, wherein the pair of legs comprises a right leg defining a right leg cavity, and a left leg defining a left leg cavity, and wherein the first oil conduit comprises separate right and left oil conduits, the right and left oil conduits respectively connecting the right and left leg cavities with the central body.

13. The integrated axle oil lubrication system of claim 9, wherein the brake assembly including a central brake hub and at least one disc, the central brake hub having a plurality of circumferentially spaced and radially extending impellers.

14. The integrated axle oil lubrication system of claim 13, wherein the brake assembly having a plurality of circumferentially spaced slots, the slots being positioned radially outwardly of the impellers.

15. The integrated axle oil lubrication system of claim 14, wherein the brake assembly having a plurality of slots, and wherein the slots extend radially outwardly from the central brake hub to facilitate transfer of oil to the second oil channel.

16. A method of making an integrated oil circulation system, comprising:
- forming an axle housing including a central body having an oil reservoir;
- providing a ring gear within the central body, such that the ring gear is rotatable about an axis, and adapted to interface with the oil reservoir for distributing oil radially within the central body;
- providing and adapting a pair of axle housing legs to extend axially and oppositely of one another from the central body;
- forming a first oil channel and a first oil port in an interior wall of the central body, the first oil port having communication with the first oil channel, the first oil channel and first oil port being adapted to convey oil externally of the central body;
- providing an oil conduit and securing the oil conduit to the oil port of the central body for conveying oil to each leg; the oil conduit secured to a second oil port formed at an extremity of each leg, the oil conduit and second oil port being adapted to convey oil to the extremity of each leg;
- providing a pair of axle shafts extending axially and oppositely of one another, the pair of axle shafts enclosed in the pair of axle housing legs, the oil conduit and second oil port supplying oil for lubricating the pair of axle shafts;
- providing a pair of brake assemblies including a central brake hub and at least one disc, the pair of brake assemblies rotatably adapted to receive return oil from along the respective axle shaft of each leg and centrifugally move oil radially outwardly of the brake assemblies, and positioning the brake assemblies at axially outboard portions of the central body, each brake assembly is situated within the central body with one brake assembly situated on each side of the ring gear;
- providing a second oil channel within the central body, the second oil channel being positioned radially outwardly of the brake assemblies, and in communication with a return oil passageway extending axially from each respective brake back to the central body, the second oil channel and return oil passageway accommodate transfer of oil from the legs back to the central body;
- wherein, the ring gear, the first oil channel, the first oil port, and the first oil conduit define a first oil lubrication sub-system adapted to move oil from the central body to the right and left housing legs; and
- wherein, the brake assembly, the at least one disc, the second oil channel and the return oil passageway define a second oil lubrication sub-system adapted to move oil from the legs back to the central body.

17. The method of claim 16, further providing the return oil passageway within the central body, such that the second oil channel interfaces with the return oil passageway, and wherein the return oil passageway defines a unidirectional flow of oil from the brake assemblies toward the central body and away from the legs.

* * * * *